US007377201B2

(12) United States Patent
Chen

(10) Patent No.: US 7,377,201 B2
(45) Date of Patent: May 27, 2008

(54) FOOD PROCESSING APPARATUS FOR FORMING STRIPS, SLICES AND CUBES

(76) Inventor: Zhui Chen, 1260 Green Vale Ct., Fenton, MO (US) 63026

(*) Notice: Subject to any disclaimer, the term of this patent is extended or adjusted under 35 U.S.C. 154(b) by 174 days.

(21) Appl. No.: 11/071,393

(22) Filed: Mar. 3, 2005

(65) Prior Publication Data

US 2006/0196334 A1 Sep. 7, 2006

(51) Int. Cl.
*B26D 3/18* (2006.01)
*B02C 18/06* (2006.01)
*A22C 9/00* (2006.01)

(52) U.S. Cl. ......................... 83/500; 83/425.2; 83/438; 83/425.3; 83/444; 83/932; 241/224; 241/236; 452/142

(58) Field of Classification Search .................. 83/120, 83/122, 356.3, 664, 469, 595, 763–765, 161, 83/162, 164, 165, 344, 345, 420, 425.4, 438, 83/444, 445, 466.1, 468.7, 498, 501, 504, 83/821, 827, 665, 932; 452/142, 150, 516; 241/292.1, 236, 224; 426/516, 518
See application file for complete search history.

(56) References Cited

U.S. PATENT DOCUMENTS

| | | | |
|---|---|---|---|
| 115,987 A | | 6/1871 | Siemers |
| 803,526 A | | 10/1905 | Cunning |
| 2,176,751 A | | 10/1939 | Spang |
| 2,223,466 A | | 12/1940 | Spang |
| 2,287,278 A | | 6/1942 | Spang |
| 2,291,809 A | | 8/1942 | Jackson |
| 2,360,729 A | | 10/1944 | Spang |
| 2,364,533 A | | 12/1944 | Jackson |
| 2,398,636 A | | 4/1946 | Henney et al. |
| 2,472,800 A | | 6/1949 | Ahrndt |
| 2,494,136 A | | 1/1950 | Marshall, Jr. et al. |
| 2,510,291 A | | 6/1950 | Mclauchlan |
| 2,516,621 A | | 7/1950 | Deckert |
| 2,531,105 A | | 11/1950 | Brown |
| 2,554,863 A | | 5/1951 | Lindner et al. |
| 2,605,497 A | | 8/1952 | Spang |
| 2,811,743 A | | 11/1957 | Crabtree, Jr. |
| 2,886,846 A | * | 5/1959 | Meyer ........................ 452/142 |
| 3,076,462 A | | 2/1963 | Meck et al. |
| 3,222,712 A | | 12/1965 | Deckert |
| 3,222,713 A | | 12/1965 | Stein et al. |
| 3,654,978 A | | 4/1972 | Gabel |
| 3,709,273 A | * | 1/1973 | Jaccard et al. ................ 83/751 |

(Continued)

*Primary Examiner*—Boyer D. Ashley
*Assistant Examiner*—Laura M. Lee
(74) *Attorney, Agent, or Firm*—Maginot, Moore & Beck

(57) ABSTRACT

A food processing apparatus comprises a first and second shaft and first, second, third and fourth subsets of blades. The first and second subsets of blades are mounted to the first shaft. The blades of the first subset of blades are separated by a first displacement. The blades of the second subset of blades are separated by a second displacement differing from the first displacement. The third and fourth subsets of blades are mounted to the second shaft. The blades of the third subset of blades are separated by the first displacement. The blades of the fourth subset of blades are separated by the second displacement. The first and third subset of blades form a first cutting region for cutting food to a first dimension and the second and fourth subset of blades form a second cutting region for cutting food to a second dimension.

18 Claims, 12 Drawing Sheets

U.S. PATENT DOCUMENTS

| | | | | | |
|---|---|---|---|---|---|
| 3,786,536 | A | | 1/1974 | Deckert | |
| 3,841,186 | A | * | 10/1974 | Demerin | 83/404.2 |
| 3,990,336 | A | * | 11/1976 | Soodalter | 83/404.2 |
| 4,638,697 | A | | 1/1987 | Hager et al. | |
| 4,960,021 | A | * | 10/1990 | Carney et al. | 83/120 |
| 5,129,299 | A | * | 7/1992 | Fischer et al. | 83/356.3 |
| 5,266,064 | A | * | 11/1993 | Gagliardi, Jr. | 452/135 |
| 5,340,354 | A | | 8/1994 | Anderson et al. | |
| 5,342,236 | A | | 8/1994 | Repisky et al. | |
| 6,561,067 | B2 | * | 5/2003 | Arrasmith | 83/145 |
| 6,895,846 | B2 | * | 5/2005 | Walker et al. | 83/403 |
| 2005/0009461 | A1 | * | 1/2005 | Palese | 452/142 |

* cited by examiner

FOOD PROCESSING APPARATUS FOR FORMING STRIPS, SLICES AND CUBES

BACKGROUND AND SUMMARY

This invention relates to food processing machines, and, more particularly, to a meat slicing machine capable of forming slices, strips and cubes from frozen, cooked or raw meat.

In the restaurant industry and particularly in the Chinese food restaurant industry, it is common for food, and in particular meat, to be cut into slices, strips and cubes. Cutting meat into slices, strips or cubes by hand can be a laborious and slow process, and uniformity of the slices, strips or cubes depends upon the skill of the person doing the cutting. In Chinese cooking "slices" are slabs of meat typically approximately four millimeters thick having varying lengths and widths. "Strips" are long pieces of meat about typically four millimeters thick and eight millimeters wide. "Cubes" are typically eight millimeters wide, eight millimeters thick and eight millimeters long.

There are, in the prior art, numerous examples of apparatus for slicing meat into strips. In U.S. Pat. No. 5,342,236 of Repisky et al., there is shown an apparatus for cutting food into strips or cubes that has first and second counter rotating shafts, each having an array of cutter discs thereon. The cutter discs on one shaft are offset from corresponding discs on the other shaft and form cutter pairs therewith. Guide means extending between cutter pairs define the maximum thickness of meat that can be cut, and the discs forming a pair overlap a distance equal to or greater than one-half the spacing between the guide means. A hand crank is coupled to rotate one of the blade carrying shafts. The other blade carrying shaft is coupled by gears to be rotated by the first blade carrying shaft at a different angular velocity than the first shaft. The device is designed to be modular so that a second set of blade carrying shafts having blades with a different spacing than the first set can replace the first set of blades to make wider or thinner slices through the meat.

In U.S. Pat. No. 3,786,536 of Deckert, there is shown an apparatus that simultaneously tenderizes and slices a slab of meat into strips. A plurality of spaced tenderizing blades is mounted on a first shaft and a lesser plurality of spaced slicing blades is mounted on a second shaft closely adjacent and parallel to the first shaft. The slicing blades, which are fewer in number than the tenderizing blades, are interleaved therewith. The two shafts are geared together so that the slicing blades revolve faster than the tenderizing blades, and the tenderizing blades penetrate the meat and pull it into the cutting area. Guide fingers are disposed between the tenderizing blades and the slicing blades for guiding the meat into the cutting area. This general arrangement of elements is common to a number of prior art meat tenderizing devices, such as is shown in U.S. Pat. No. 4,672,716 of Dickey, which also includes stripper plates for preventing the meat from wrapping around the rollers. Such wrapping of the meat around the rollers occurs frequently when raw meat is being tenderized or cut.

In U.S. Pat. No. 2,163,123 of Huse, there is shown a meat tenderizing machine having the general structure of parallel shafts having interleaved cutters geared together to counter rotate relative to each other to draw the meat into the cutting area. Spring loaded fingers interspersed between the blades function to guide the meat into the cutting area and to prevent the meat from wrapping around the shafts. Inasmuch as the Huse arrangement does not cut the meat into strips, it is less likely that the slab of meat will wrap around the shafts, although such wrapping can occur in the Huse mechanism if the guide fingers are not present and functioning.

As discussed in the foregoing, many of the prior art devices are directed to meat tenderizing, i.e., scoring the meat, and not to meat slicing. Even the Deckert arrangement, which does slice the meat, simultaneously scores the meat into the cutting area as the tenderizing blades pull the meat therethrough. In all such cases, the apparatus is designed to process raw meat. Of the foregoing patents, only the Repiskey et al. patent disclosed a slicer that does not simultaneously tenderize the meat.

In restaurants which serve Chinese cuisine, it is much more efficient and economical to cook the meat before slicing or cubing it. Cooked meat loses most of the glutinous tendencies of raw meat and thus is less likely to cling to the cutting blades or to wrap around the shafts. On the other hand, cooked meat is more susceptible to tearing or ragged cutting. Thus, in an apparatus of the type shown in the Deckert patent, the toothed tenderizing wheels, if used with cooked meat, would tend to tear the meat, resulting in unsightly strips or cubes. Even arrangements such as in the Huse apparatus, which apparently does not use toothed tenderizing wheels to tenderize the meat, tend to make ragged shallow cuts in the meat.

Food preparers would appreciate a device that can cut food, such as meat, into neat, clean-cut strips or cubes, whether the food is raw or cooked. The disclosed meat slicing apparatus, as opposed to a meat tenderizing apparatus, are adapted to produce cleanly cut slices, strips or cubes of either cooked or raw meat.

According to one aspect of the invention, a food processing apparatus for slicing food into slabs, strips and cubes comprises a frame, a first and second shaft and first, second, third and fourth subsets of blades. The first shaft is coupled to the frame for rotation relative to the frame about a longitudinal axis of the first shaft. The second shaft is coupled to the frame for rotation relative to the frame about a longitudinal axis of the second shaft. The longitudinal axis of the second shaft is disposed substantially parallel to the longitudinal axis of the first shaft and is displaced therefrom by a displacement. The first and second subsets of blades are mounted to the first shaft. Each blade of the first subset of blades is displaced along the longitudinal axis of the first shaft from adjacent blades of the first subset of blades by a first displacement. Each blade of the second subset of blades is displaced along the longitudinal axis of the first shaft from adjacent blades of the second subset of blades by a second displacement differing from the first displacement. The third and fourth subsets of blades are mounted to the second shaft. Each blade of the third subset of blades is displaced along the longitudinal axis of the second shaft from adjacent blades of the third subset of blades by the first displacement. Each blade of the fourth subset of blades is displaced along the longitudinal axis of the second shaft from adjacent blades of the fourth subset of blades by the second displacement. The first subset of blades cooperate with the third subset of blades to form a first cutting region therebetween for cutting food to a first dimension and the second subset of blades cooperate with the fourth subset of blades to form a second cutting region therebetween for cutting food to a second dimension.

According to another aspect of the disclosure, a food processing apparatus comprises a frame, a first and second shaft, a first and second set of pairs of cooperating blades, a motor, a linkage and a food orientation guide. The first shaft is coupled to the frame for rotation relative to the frame about a longitudinal axis of the shaft. The second shaft is coupled to the frame for rotation relative to the frame about a longitudinal axis of the second shaft. The longitudinal axis of the second shaft is disposed substantially parallel to the longitudinal axis of the first shaft and is displaced therefrom. Each pair of cooperating blades in the first and second set of cooperating pairs of blades includes a first blade mounted to the first shaft and a second blade mounted to the second shaft in close proximity to the first blade. Each pair of cooperating blades in the first set of cooperating pairs of blades is spaced apart from adjacent pairs of cooperating blades in the first set of pairs of cooperating blades by a first displacement and is adjacent another pair of cooperating blades in the first set of pairs of cooperating blades to define a first cutting region between the first and second shaft. Each pair of cooperating blades in the second set of cooperating pairs of blades is spaced apart from adjacent pairs of cooperating blades in the second set of pairs of cooperating blades by a second displacement and is adjacent another pair of cooperating blades in the second set of pairs of cooperating blades to define a second cutting region between the first and second shaft. The motor has a drive shaft and the linkage is configured to convert rotation of the drive shaft of the motor into rotation of the first and second shafts. The food orientation guide is movable relative to the frame and adapted to guide unprocessed food into one cutting region when in a first position and to guide previously processed meat into the other cutting region when in a second position.

According to yet another aspect of the disclosure, a food slicing apparatus for slicing food into strips comprises a frame, a first and second shaft, a first and second set of pairs of cooperating blades and a means for rotating the first and second shafts. The first shaft is coupled to the frame for rotation relative to the frame about a longitudinal axis of the shaft. The second shaft is coupled to the frame for rotation relative to the frame about a longitudinal axis of the second shaft. The longitudinal axis of the second shaft is disposed substantially parallel to the longitudinal axis of the first shaft and is displaced therefrom. Each pair of cooperating blades in the first and second set of cooperating pairs of blades includes a first blade mounted to the first shaft and a second blade mounted to the second shaft in close proximity to the first blade. Each pair of cooperating blades in the first set of cooperating pairs of blades is spaced apart from adjacent pairs of cooperating blades in the first set of pairs of cooperating blades by a first displacement and is adjacent another pair of cooperating blades in the first set of pairs of cooperating blades to define a first cutting region between the first and second shaft. Each pair of cooperating blades in the second set of cooperating pairs of blades is spaced apart from adjacent pairs of cooperating blades in the second set of pairs of cooperating blades by a second displacement and is adjacent another pair of cooperating blades in the second set of pairs of cooperating blades to define a second cutting region between the first and second shaft.

The various objects and features of the present invention can more readily be understood and appreciated from the following detailed description, read in conjunction with the accompanying drawings.

BRIEF DESCRIPTION OF THE DRAWINGS

The illustrative devices will be described hereinafter with reference to the attached drawings which are given as non-limiting examples only, in which.

Corresponding reference characters indicate corresponding parts throughout the several views. Like reference characters tend to indicate like parts throughout the several views.

DETAILED DESCRIPTION

Figure 1:
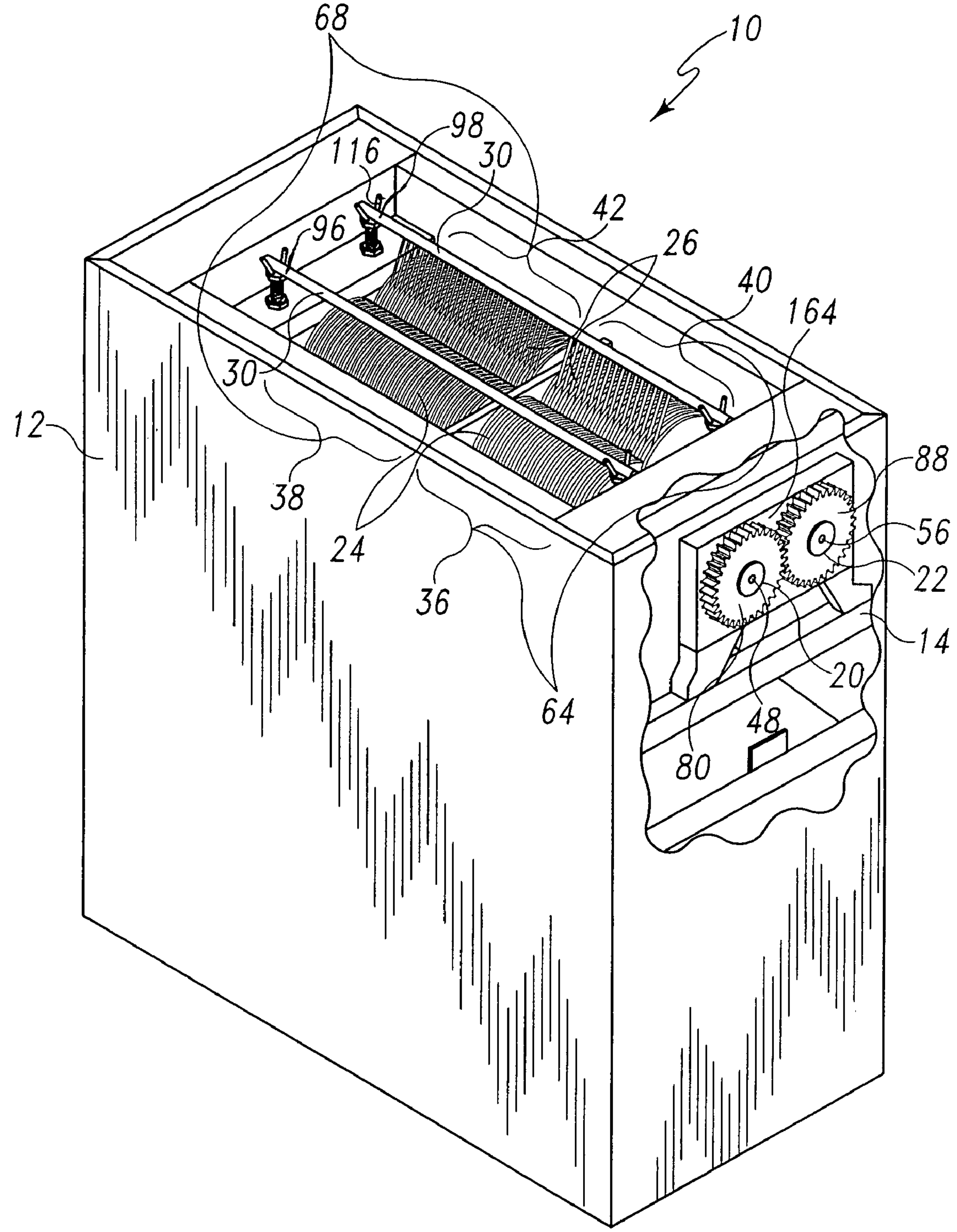
FIG. 1 is a perspective, partially cutaway view of a first embodiment of a food processing apparatus showing a first shaft and a second shaft mounted to a frame for rotation about their longitudinal axes and gears coupling the first shaft to the second shaft to facilitate counter-rotation of the shafts, blades disposed on the first shaft and the second shaft cooperate to form blade pairs in a first region having a first displacement between adjacent blade pairs and blade pairs in a second region having a second displacement between adjacent blade pairs, and a first and second meat guide mounted on the frame so that fingers of the guides extend between adjacent blades on the first and second shaft.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The disclosed devices 10 are very similar in construction and operation and thus, similar reference numerals will be used to identify similar components and identical reference numerals will be utilized to identify identical components. Those skilled in the art will recognize that much of the description of first embodiment of food processing apparatus 10 shown in FIGS. 1 and 2 will be applicable to the second embodiment of food processing apparatus shown in FIGS. 3-10 and vice versa. To avoid unnecessary duplication, certain aspects of both devices will be described with reference to a single device, that description being equally applicable to the other device.

The disclosed embodiments of food processing apparatus 10 each include a frame 14 which has first and second parallel shafts 20, 22 mounted thereto for rotational movement about their longitudinal axes 32, 34. Each shaft 20, 22 has arrayed thereon a plurality of cutting discs or blades which are maintained in spaced relationship to each other by spacers on the shaft 20, 22. The dimensions and orientation of the spacers are such that the cutting discs on the two shafts 20, 22 are interleaved and overlapped to form pairs of closely adjacent cutters, with the spacing between adjacent pairs approximating the desired width of the cut meat strips.

The shafts 20, 22 are coupled together to be counter rotating, with the coupling being designed to produce a similar speed of rotation for both sets of cutting discs. One of the shafts 20 is rotated by a motor 16 and through the coupling drives the other shaft 22.

Mounted on top of the frame 14 are first and second guide members 96, 98, 696, 698 for centering the meat to be cut and guiding it into the cutting area between the two shafts 20, 22. The lower extensions of the guide members 96, 98, 696, 698 are elongated fingers or teeth 102, 104, 702, 704 so spaced that adjacent fingers 102, 104, 702, 704 straddle each pair of cutter blades and the fingers 102, 104, 702, 704 themselves extend into and through the space between adjacent pairs of cutter blades or discs. The fingers 102, 104, 702, 704 function to guide the meat to be cut through the cutting area and to prevent any wrapping or jamming of the meat, whether cooked or raw.

Each shaft 20, 22 includes two subsets of blades, the first subset of blades 36, 40 includes blades that are spaced apart from other blades in the first subset of blades 36, 40 by a first spacing and the second subset of blades 38, 42 includes blades that are spaced apart from the other blades in the second subset of blades 38, 42 by a second spacing different from the first spacing. The two shafts 20, 22 are mounted so that the first subset of blades 36 on the first shaft 20 cooperates with the first subset of blades 40 on the second shaft 22 to cut food to a first thickness and the second subset of blades 38 on the first shaft 20 cooperates with the second subset of blades 42 on the second shaft 22 to cut food to a second thickness different than the first thickness. Thus, food can be cut into strips by passing the food between the first subsets of blades 36, 40, reorienting the cut food and passing the food between the second subsets of blades 38, 42.

Figure 2:
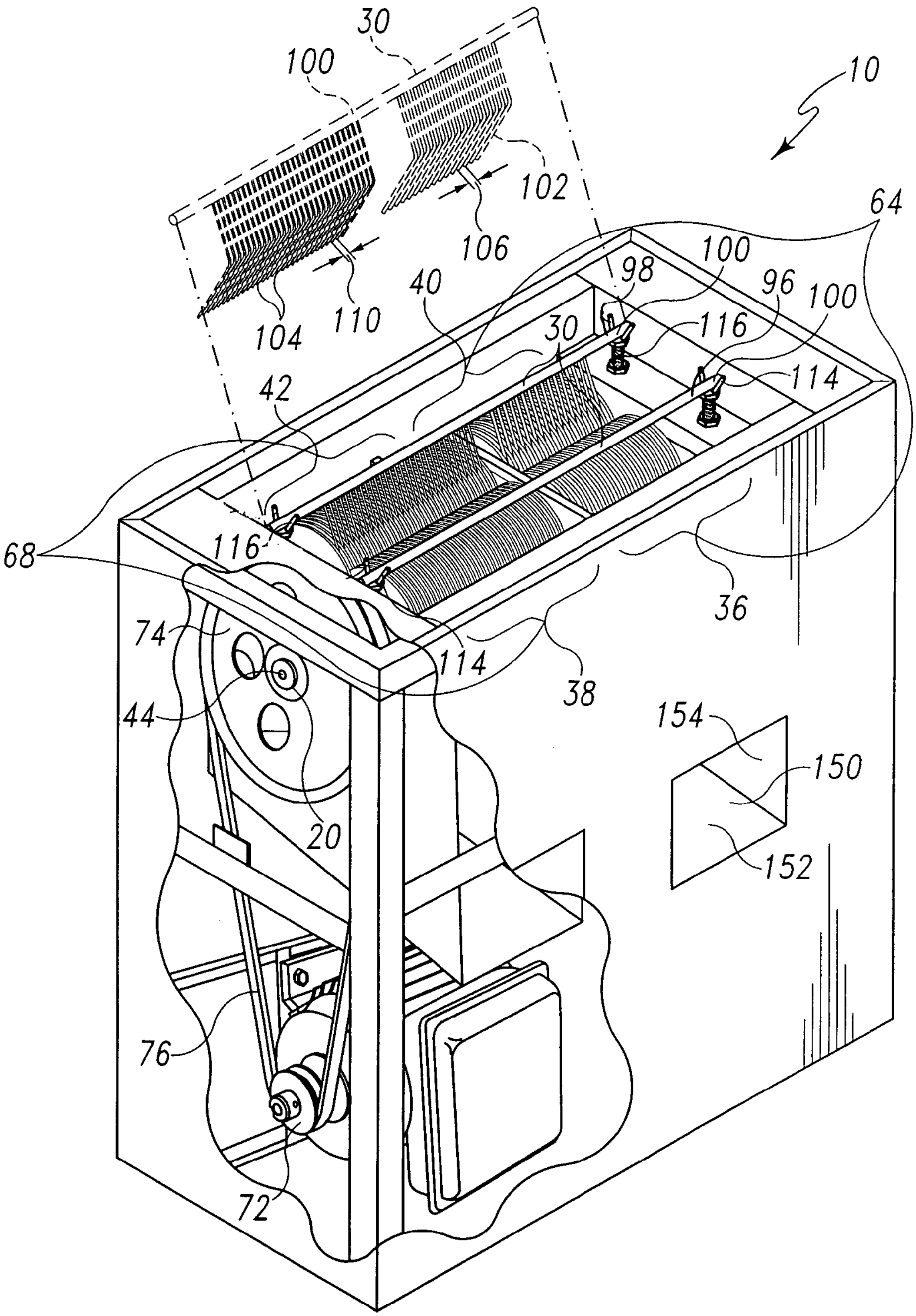
FIG. 2 is a perspective, partially cutaway view of the apparatus of FIG. 1 showing a linkage between a motor and the first shaft including a driven pulley coupled to the first shaft, a drive pulley mounted to the shaft of a motor, and a belt coupling the driven pulley to the drive pulley and a meat guide removed from between the blades on the second shaft.
Figure 3:
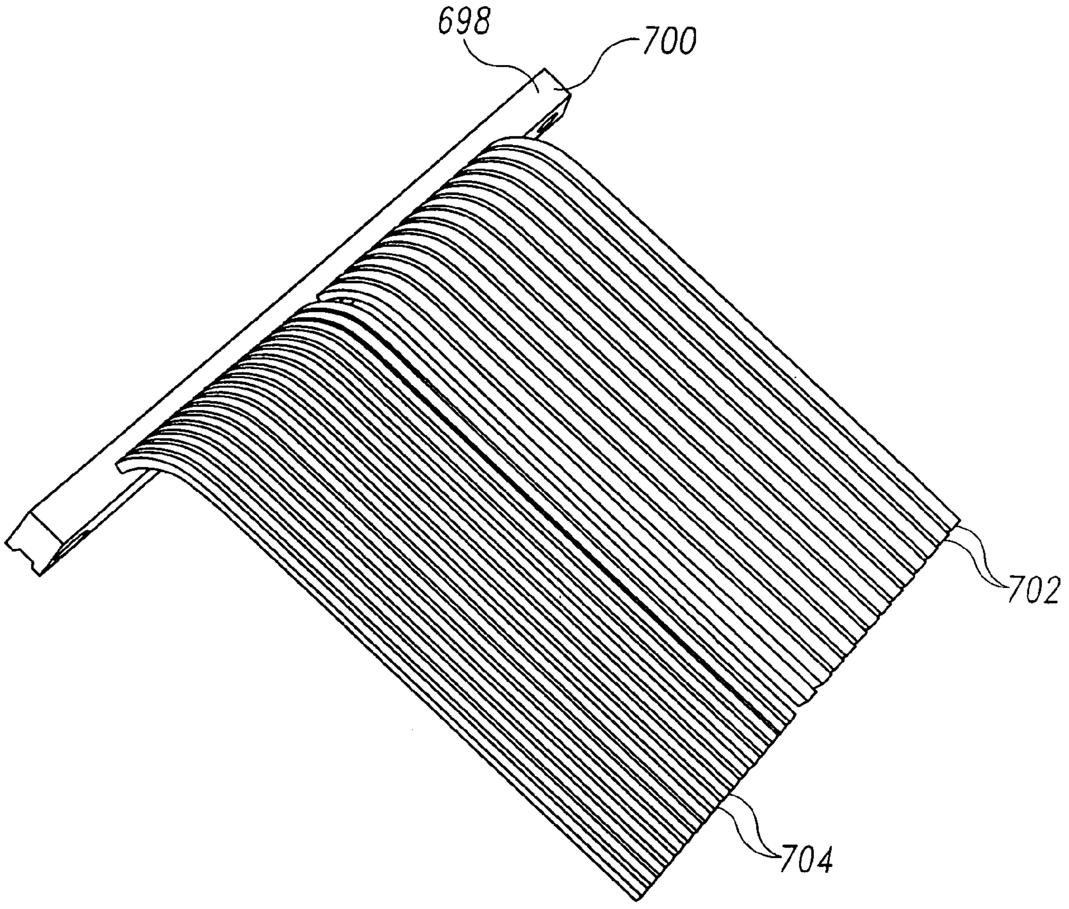
FIG. 3 is a perspective view of a second embodiment of a meat guide for use with a second embodiment of the food processing apparatus of FIG. 6, showing one of two comb-shaped guides having fingers mounted to a spine with a first set of fingers each of which is displaced from adjacent fingers of the first set of fingers by a first displacement and a second set of fingers each of which is displaced from adjacent fingers of the second set of fingers by a second displacement.
Figure 4:
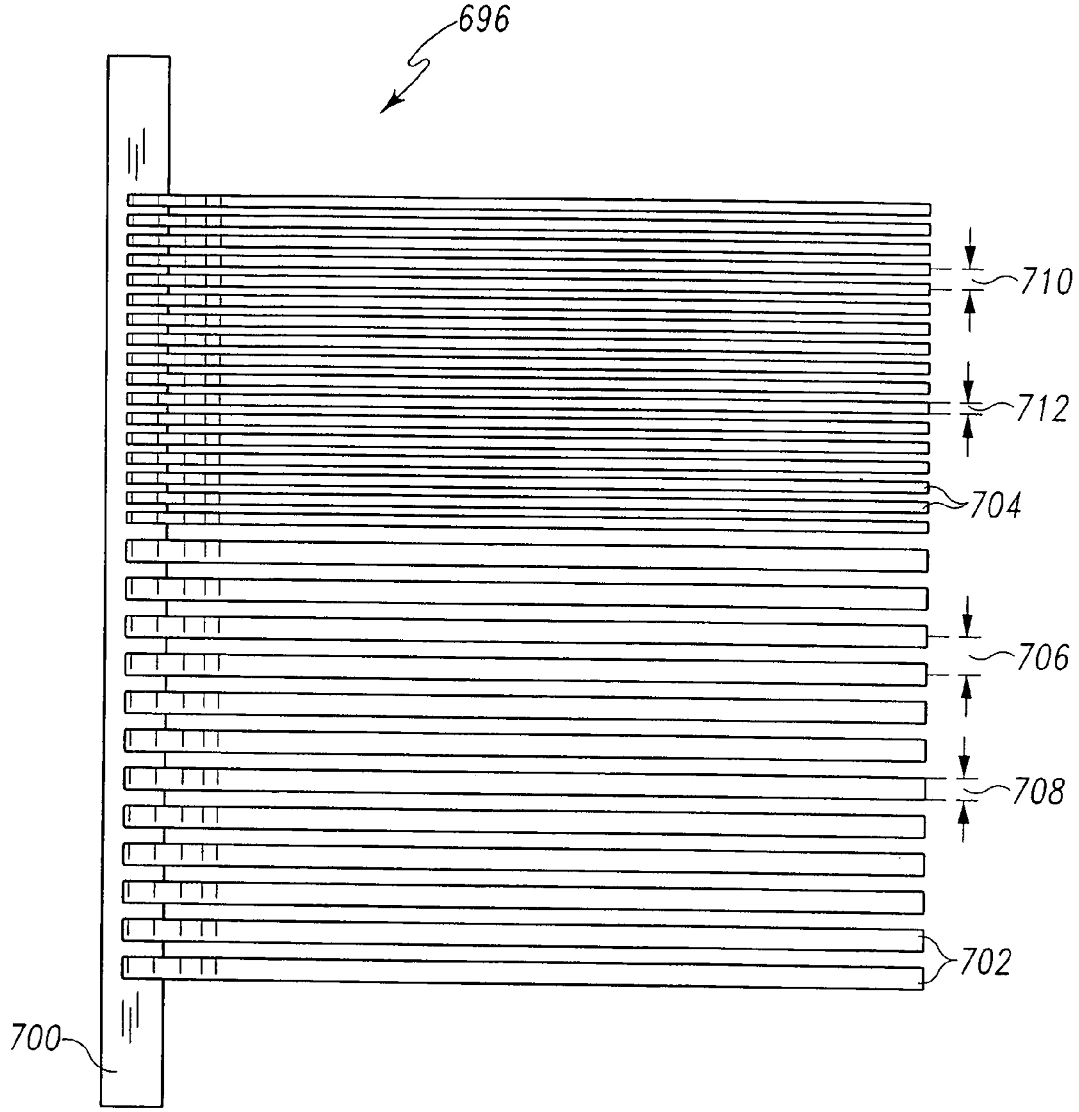
FIG. 4 is a plan view of the other of the two comb-shaped guides for use with the comb-shaped guide of FIG. 3 to form the second embodiment of a meat guide.
Figure 5:
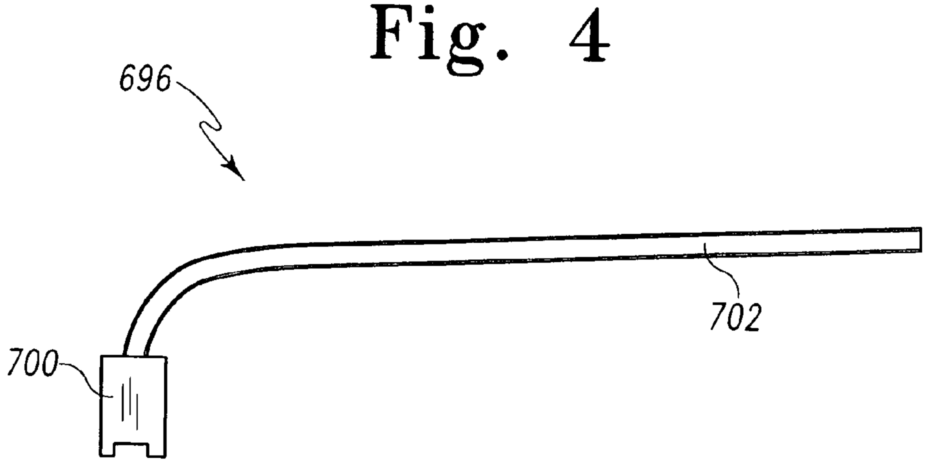
FIG. 5 is an elevation view of the guide of FIG. 4.

As shown, for example in FIG. 1, the first disclosed embodiment of a food processor 10 includes a housing 12, a frame 14, a motor 16, a linkage 18, two shafts 20, 22 on which sets of counter rotating disc shaped blades, 24, 26, respectively, are mounted, a meat guard 28 and a meat guide 30. In the illustrated embodiment, the first set of blades 24 is mounted on the first shaft 20, while the second set of blades 26 is mounted on the second shaft 22. Each set of blades 24, 26 is mounted on its respective shaft 20, 22 perpendicular to the longitudinal axis 32, 34 of the shaft 20, 22. Each shaft 20, 22 is mounted to the frame 14 of the food processor 10 to rotate about the shaft's longitudinal axis 32, 34.

The first set of blades 24 mounted on the first shaft 20 includes a first subset of blades 36 and a second subset of blades 38. Similarly the second set of blades 26 mounted on the second shaft 22 includes a third subset of blades (the first subset of blades on the second shaft) 40 and a fourth subset of blades (the second subset of blades on the second shaft) 42.

The first subset of blades 36 are mounted adjacent one end 44 of the shaft 20. The blades 24 of the first subset of blades 36 are spaced apart from each other by a displacement 46. The displacement 46 between each adjacent blade 24 of the first subset of blades 36 is illustratively approximately eight millimeters. The second subset of blades 38 are mounted adjacent the other end 48 of the shaft 20. The blades 26 of the second subset of blades 38 are spaced apart from each other by a displacement 50. In the illustrated embodiment, the displacement 50 is approximately four millimeters.

Similarly, the third subset of blades 40 are mounted adjacent one end 52 of the shaft 22. The blades 26 of the third subset of blades 40 are spaced apart from each other by a displacement 54. The displacement 54 between each adjacent blade 26 of the third subset of blades 40 is illustratively approximately eight millimeters apart. The fourth subset of blades 42 are mounted adjacent the other end 56 of the shaft 22. Each blade 26 of the fourth subset of blades 42 is spaced apart from each adjacent blade 26 in the fourth subset of blades 42 by a displacement 58. In the illustrated embodiment, the displacement 58 is approximately four millimeters.

In the illustrated embodiment, the shafts 20, 22 of the two sets of blades 24, 26 are mounted horizontally parallel to one another. The blades 24, 26 in both sets have a diameter 60 greater than the displacement 62 between the shafts 20, 22 so that the blades 24, 26 overlap in the center. The shafts 20, 22 are arranged so that the first subset of blades 36 and the third subset of blades 40 interleave and are positioned adjacent to each other to form a first region of blade pairs 64 formed from a blade 24 on the first shaft 20 and a blade 26 on the second shaft 22. Blade pairs in the first region 64 are displaced from their adjacent pairs of blades in the first region 64 by a displacement 66 approximately equal to the displacements 46, 54 between blades 24, 26 in the first and third subset of blades 36, 40, respectively. Thus, in the illustrated embodiment, displacement 66 is approximately eight millimeters.

Similarly, due to the arrangement of the shafts 20, 22, the second subset of blades 38 and the fourth subset of blades 42 interleave and are positioned adjacent to each other to form a second region of blade pairs 68 formed from a blade 24 on the first shaft 20 and a blade 26 on the second shaft 22. Blade pairs in the second region 68 are displaced from their adjacent pairs of blades in the second region 68 by a displacement 70 approximately equal to the displacements 50, 58 between blades 24, 26 in the second and fourth subset of blades 38, 42, respectively. Thus, in the illustrated embodiment, displacement 70 is approximately four millimeters.

Figure 6:
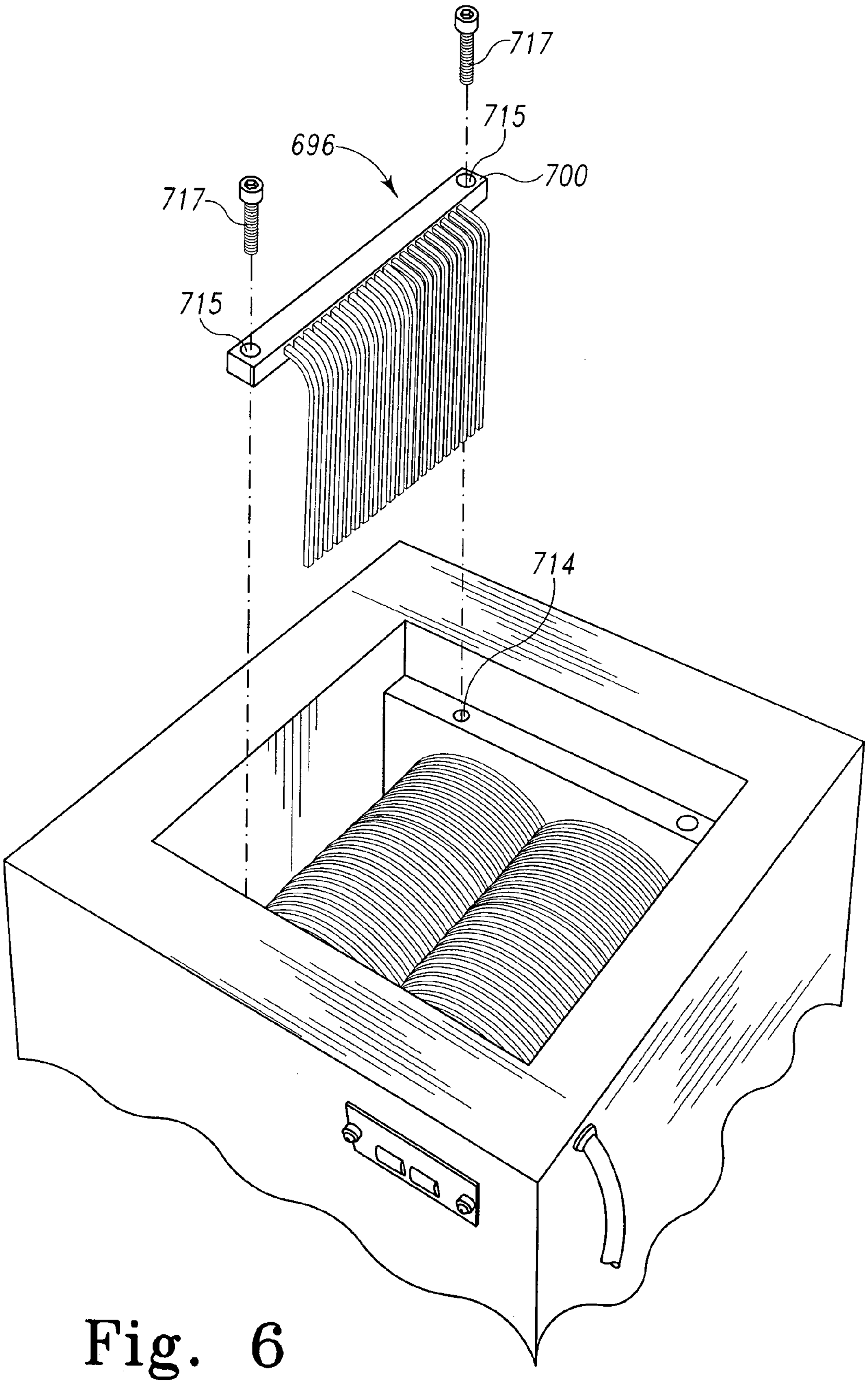
FIG. 6 is a perspective partially exploded view of the second embodiment of the food processing apparatus with a cover removed, a first meat guide oriented for insertion between a first set of blades and a second meat guide not illustrated.

While shown in FIG. 1 as being separated by a dividing spacer placed on the shafts 20, 22, the first region 64 of blade pairs and the second region 68 of blade pairs may be adjacent one another with a central pair of cooperating blades being shared by both regions as shown, for example, in FIG. 6. When so arranged, the central pair of cooperating blades would be a blade pair of both the first and second region 64, 68 of blade pairs.

In the first embodiment of food processor 10, the first set of blades 24 is driven by the motor 16 coupled to the shaft 20 to which the blades 24 are mounted by the linkage 18. In the illustrated embodiment, the linkage 18 comprises a drive pulley 72, a driven pulley 74, and a belt 76. In the first illustrated embodiment, each of the pulleys 72, 74 is configured to include a single channel for receipt of the belt 76 therein. Those skilled in the art will recognize that pulleys configured to drive and be driven by dual belts could be utilized within the scope of the disclosure, as shown, for example, in FIGS. 9 and 10.

The driven pulley 74 has a diameter greater than the diameter of the drive pulley 72 to which it is coupled by the belt 76. The drive pulley 72 is coupled to the drive shaft of the motor 16. The driven pulley 74 is coupled to one end 44 of the shaft 20. Due to the relative size of the driven pulley 74 and the drive pulley 72, the angular velocity of the shaft 20 is smaller than the angular velocity of the drive shaft of the motor 16. Thus, linkage 18 acts to reduce the angular velocity of the shaft 20 as compared to the angular velocity of the motor 16. This reduction in angular velocity also acts to increase the torque of the shaft 20 to reduce the likelihood that a meat jam could result in a stall.

While the illustrated linkage 18 is described as two pulleys 72, 74, and a belt 76, the shaft 20 may be coupled to the motor 16 to be driven thereby utilizing other linkages 18. Such other linkages 18 include, but are not limited to, dual belts and two dual channeled pulleys, a chain and two sprockets, gears, a plurality of reduction shafts with pulleys, gears or sprockets mounted thereto and appropriate flexible linkages such as chains or belts and other couplings. One alternative linkage 618 that may be utilized with the first embodiment of food processor 10 is illustrated with regard to the second embodiment of food processor.

In the second embodiment of food processor, the first set of blades 24 is driven by the motor 16 coupled to the shaft 20 to which the blades 24 are mounted by the linkage 618. In the illustrated embodiment, the linkage 618 comprises a dual drive pulley 672, a dual driven pulley 674, two belts 676, 678, a reduction shaft 671, a large reduction pulley 673, a small reduction pulley 675 and two belts 677, 679. In the illustrated embodiment, each of the pulleys 672, 674, 673, 675 is configured to include two channels for receipt of two belts therein. Those skilled in the art will recognize that pulleys configured to drive and be driven by a single belt could be utilized within the scope of the disclosure.

The large reduction pulley 673 is coupled to one end of the reduction shaft 671 and the small reduction pulley 675 is coupled to the opposite end of the reduction shaft 671. The large reduction pulley 673 has a diameter greater than the diameter of the drive pulley 672 to which it is coupled by the two belts 677, 679. The dual drive pulley 672 is coupled to the drive shaft of the motor 16. Due to the relative size of the large reduction pulley 673 and the drive pulley 672, the angular velocity of the reduction shaft 671 is smaller than the angular velocity of the drive shaft of the motor 16.

As its name indicates, the small reduction pulley 675 has a diameter smaller than the diameter of the large reduction pulley 673. Since both the large reduction pulley 673 and small reduction pulley 675 are mounted to reduction shaft 671, both reduction pulleys 673, 675 revolve at the same angular velocity. The diameter of the small reduction pulley 673 is also smaller than the diameter of the driven pulley 674. The driven pulley 674 is coupled to one end 44 of the shaft 20. The first belt 676 and the second belt 678 are tensioned between the small reduction pulley 675 and the dual driven pulley 674 so that rotation of the reduction shaft 671 induces rotation of the first shaft 20. Due to the relative size of the small reduction pulley 675 and the driven pulley 674, the angular velocity of the shaft 20 is smaller than the angular velocity of the reduction shaft 671, which as mentioned above is smaller than the angular velocity of the drive shaft of the motor 16. Thus, linkage 618 acts to reduce the angular velocity of the shaft 20 as compared to the angular velocity of the motor 16. This reduction in angular velocity also acts to increase the torque of the shaft 20 to reduce the likelihood that a meat jam could result in a stall.

The shaft 20 on which the first set of blades 24 is mounted includes a drive gear 80 on the end 48 of the shaft 20 opposite the end 44 to which the driven pulley 74 is mounted. Each blade of the first set of blades 24 has a beveled edge 82 on one side 84 of the blade while the other side 86 of the blade is planar. Illustratively, the side 84 of each blade having the beveled edge 82 faces the gear end 48 of the shaft 20.

The shaft 22 on which the second set of blades 26 are mounted includes a driven gear 88 mounted to the gear end 56 of the shaft 22. The driven gear 88 is configured to mesh with and be driven by the drive gear 80 on the end 48 of the first shaft 20. Thus the shaft 20 of the first set of blades 24 and the shaft 22 of the second set of blades 26 rotate in opposite directions.

Each blade of the second set of blades 26 has a beveled edge 90 on one side 92 of the blade while the other side 94 of the blade is planar. Illustratively, the planar side 94 of each blade faces the gear end 56 of the shaft 22. Thus, the beveled edge 90 of the blades of the second set of blades 26 faces away from the gear end 56 of the shaft 22. The first set of blades 24 and the second set of blades 26 are mounted so that the flat sides 86 of each of the blades of the first set of blades 24 engage or nearly engage the flat sides 94 of its associated blade pair of the second set of blades 26 in the region between the shafts 20, 22.

In the first embodiment of the food processor 10, the illustrated meat guide 30 comprises a first comb-shaped guide member 96 and a second comb-shaped guide member 98 similarly configured. While those skilled in the art will recognize that the first and second comb-shaped guide members 96, 98 will need to be differently configured to specifically address the shaft that they are intended to keep meat from wrapping around, they are also generally very similar. In the illustrated embodiment, the first and second comb-shaped guide members 96, 98 are symmetrical to each other about a plane extending vertically through the center of the cutting region parallel to the axes of the first and second shafts 20, 22. Therefore, only the second comb-shaped guide member 98 (the one configured to prevent meat from wrapping around the second shaft 22, and shown in phantom lines in FIG. 2) will be described, it being understood that the first comb-shaped guide member 96 will contain similar components that are configured to address the need of preventing meat from wrapping around the first shaft 20.

The second comb-shaped guide member 98 of the meat guide 30 includes a spine 100, a first set of teeth 102 and a second set of teeth 104. Each tooth 102, 104 is coupled to and extends away from the spine 100. Each tooth 102, 104 is bent to go around the shaft 22 and extend vertically downwardly tangent to the shaft 22. Each tooth of the first set of teeth 102 is displaced from the adjacent tooth in the first set of teeth 102 by a displacement 106 approximately equal to the displacement 66 between the blade pairs in the first region of blade pairs 64. Thus, in the illustrated embodiment, displacement 106 is approximately eight millimeters. In the illustrated embodiment, the teeth of the first set of teeth 102 are formed from wire stock having a diameter smaller than, but similar to, the displacement 66 between the blade pairs in the first region of blade pairs 64. Thus, in the illustrated embodiment, diameter is approximately seven millimeters so that the teeth 102 can fit in the approximately eight millimeter gap between the pairs of blades in the first region 64.

Similarly, each tooth of the second set of teeth 104 is displaced on center from the adjacent tooth in the second set of teeth 104 by a displacement 110 approximately equal to the displacement 70 between the blade pairs in the second region of blade pairs 68. Thus, in the illustrated embodiment, displacement 110 is approximately four millimeters. In the illustrated embodiment, the teeth of the second set of teeth 104 are formed from wire stock having a diameter smaller than, but similar to, the displacement 70 between the blade pairs in the second region of blade pairs 68. Thus, in the illustrated embodiment, diameter is approximately three millimeters so that the teeth 104 can fit in the approximately four millimeter gap between the pairs of blades in the second region 68.

The spine 100 of the comb-shaped guide member 96 is mounted above and to the outside of its related set of blades 24 on shaft 20 to urge meat between the blades 24 in a manner that prevents the meat from wrapping around the shaft 20. In the illustrated embodiment, two upwardly opening Y-shaped guide holders 114 are mounted to horizontal cross members of the frame 14 to receive the spine 100 of the first comb-shaped guide member 96 therein. When the spine 100 of the first comb-shaped guide member 96 is received in the guide holders 114, the first set of fingers 102 extend downwardly between the first subset 36 of blades on shaft 20 and the second set of fingers 104 extend downwardly between the second subset 38 of blades on the shaft 20. The fingers 102, 104 engage shaft 20 and are positioned on the side of shaft 20 that faces the second shaft 22.

The spine 100 of the second comb-shaped guide member 98 is mounted above and to the outside of its related set of blades 26 on shaft 22 to urge meat between the blades 26 in a manner that prevents the meat from wrapping around the shaft 22. In the illustrated embodiment, two upwardly opening Y-shaped guide holders 116 are mounted to horizontal cross members of the frame 14 to receive the spine 100 of the second comb-shaped guide member 98 therein. When the spine 100 of the second comb-shaped guide member 98 is received in the guide holders 116, the first set of fingers 102 extend downwardly between the third subset of blades on shaft 22 and the second set of fingers 104 extend downwardly between the fourth subset of blades on the shaft 22. The fingers 102, 104 engage shaft 22 and are positioned on the side of shaft 22 that faces the first shaft 20.

Thus, the first and second comb-shaped guide members 96, 98 cooperate to act as a meat guide 30 that guides the meat being cut between the blades 24, 26 while inhibiting the meat from wrapping around the shafts 20, 22. While the meat guide 30 has been described as being comprised of two comb-shaped guide members, those skilled in the art will recognize that the guide 30 may be formed from bent sheet metal which is cut to form teeth and a spine or in other manners, such as that disclosed hereinafter with regard to meat guides 696, 698 or in the prior art, within the scope of the disclosure.

As shown, for example, in FIGS. 3-7, in the second embodiment of the food processor 10, the illustrated meat guide 630 comprises a first comb-shaped guide member 696 and a second comb-shaped guide member 698 similarly configured. While those skilled in the art will recognize that the first and second comb-shaped guide members 696, 698 will need to be differently configured to specifically address the shaft that they are intended to keep meat from wrapping around, they are also generally very similar. Therefore, only the first comb-shaped guide member 696 (the one configured to prevent meat from wrapping around the first shaft 20) will be described, it being understood that the second comb-shaped guide member 698 will contain similar components that are configured to address the need of preventing meat from wrapping around the second shaft 22.

The first comb-shaped guide member 696 of the meat guide 630 includes a spine 700, a first set of teeth 702 and a second set of teeth 704. Each tooth 702, 704 is coupled to and extends away from the spine 700. Each tooth 702, 704 is bent to go around the shaft 20 and extend vertically downwardly tangent to the shaft 20. Each tooth of the first set of teeth 702 is displaced from the adjacent tooth in the first set of teeth 702 by a displacement 706 approximately equal to the displacement 66 between the blade pairs in the first region of blade pairs 64. Thus, in the illustrated embodiment, displacement 706 is approximately eight millimeters. In the illustrated embodiment, the teeth of the first set of teeth 702 are formed from rectangular metal stock having a width 708 smaller than, but similar to, the displacement 66 between the blade pairs in the first region of blade pairs 64. Thus, in the illustrated embodiment, width 708 is approximately seven millimeters so that the teeth 702 can fit in the approximately eight millimeter gap between the pairs of blades in the first region 64.

Similarly, each tooth of the second set of teeth 704 is displaced on center from the adjacent tooth in the second set of teeth 704 by a displacement 710 approximately equal to the displacement 70 between the blade pairs in the second region of blade pairs 68. Thus, in the illustrated embodiment, displacement 710 is approximately four millimeters. In the illustrated embodiment, the teeth of the second set of teeth 704 are formed from rectangular metal stock having a width 712 smaller than, but similar to, the displacement 70 between the blade pairs in the second region of blade pairs 68. Thus, in the illustrated embodiment, width 712 is approximately three millimeters so that the teeth 704 can fit in the approximately four millimeter gap between the pairs of blades in the second region 68.

The spine 700 of the comb-shaped guide member 96 is mounted above and to the outside of its related set of blades 24 on shaft 20 to urge meat between the blades 20 in a manner that prevents the meat from wrapping around the shaft 20. In the illustrated embodiment, two mounting holes 714 (only one of which is visible in FIG. 6) are formed in the horizontal cross members of the frame 14 and two mounting holes 715 are formed in the spine 700. Fasteners 717 such as sheet metal screws extend through the mounting holes 715 in the spine 700 and mounting holes 714 in the horizontal cross members of the frame 14 to mount the first comb-shaped guide member 696 to the frame 14. As shown, for example, in FIG. 7, when the spine 700 of the first comb-shaped guide member 696 is so mounted to the horizontal cross members of the frame 14, the first set of fingers 702 extend downwardly between the first subset of blades on shaft 20 and the second set of fingers 704 extend downwardly between the second subset of blades on the shaft 20. The fingers 702, 704 engage the shaft 20 and are positioned on the side of shaft 20 that faces the second shaft 22.

The spine 700 of the second comb-shaped guide member 698 is mounted above and to the outside of its related set of blades 26 on shaft 22 to urge meat between the blades 26 in a manner that prevents the meat from wrapping around the shaft 22. In the illustrated embodiment, two mounting holes (not numbered, but one of which is visible in FIG. 6) are formed in the horizontal cross members of the frame 14 and two mounting holes are formed in the spine 700. Fasteners such as sheet metal screws extend through the mounting holes in the spine 700 and mounting holes in the horizontal cross members of the frame 14 to mount the second comb-shaped guide member 698 to the frame 14. As shown, for example, in FIG. 7, when the spine 700 of the second comb-shaped guide member 698 is so mounted to the horizontal cross members of the frame 14, the first set of fingers 702 extend downwardly between the third subset of blades on shaft 22 and the second set of fingers 704 extend downwardly between the fourth subset of blades on the shaft 22. The fingers 702, 704 engage the shaft 22 and are positioned on the side of shaft 22 that faces the first shaft 20.

Thus, the first and second comb-shaped guide members 696, 698 cooperate to act as a meat guide 630 that guides the meat being cut between the blades 24, 26 while inhibiting the meat from wrapping around the shafts 20, 22. While the meat guide 30 has been described as being comprised of two comb-shaped guide members, those skilled in the art will recognize that the guide 630 may be formed from bent sheet metal which is cut to form teeth and spine or in other manners disclosed hereinbefore with regard to meat guides 96, 98 or in the prior art within the scope of the disclosure.

The illustrated embodiment of a meat processing apparatus 10 includes a meat orientation guide 28 configured ride on the side walls of the feed hole 132 in the top wall 134 of the housing 12. Alternatively, the meat orientation guide 28 could ride on the spines 100, 700 of the comb-shaped guides 96, 98, 696, 698. The meat orientation guide 28 includes a main component 118 and a divider component 120. The main component 118 includes isosceles trapezoidal end walls 146, 148 coupled to rectangular side walls 136, 138 that cooperate to define an upper opening 124 in communication with a lower opening 126. Each end wall 146, 148 includes a lower blade divider portion 147, 149 extending downwardly beyond the bottom walls of the side walls 136, 138. The blade divider portions 147, 149 are configured to be disposed between pairs of blades of the first or second region of blades.

The divider component 120 is an isosceles trapezoidal sheet of material having arms 122 extending laterally from the ends of the upper wall. The divider component 120 is configured to be received in the main component 118 to divide the upper opening 124 and lower opening 126 into smaller effective openings that more closely approximate a dimension of the meat to be fed through the meat orientation guide 28.

The illustrated meat orientation guide 28 is configured to include a first lip 128 and a second lip 130 extending from the side walls 136, 138 on opposite sides of the upper opening 124. The lips 128, 130 are configured to engage and ride on the upper surface of the housing 12 adjacent a meat feed hole 132 formed in the upper wall 134 of the housing 12. Alternatively, the lips 128, 130 may engage and ride on the spines 100, 700 of the first and second comb-shaped guide members 96, 98, 696, 698. Thus, the meat orientation guide 28 is configured to slide along the spines 100, 700 or the upper wall 134 of the housing 12 so that the lower opening 126 can be disposed over either the first region of blade pairs 64 or the second region of blade pairs 68.

The upper wall of each side wall 136, 138 is formed to include notches 142 for receiving an arm 122 extending from the upper wall of the isosceles trapezoidal divider component 120. Each notch 142 on the upper wall of one side wall 136, 138 corresponds to an associated notch 142 on the upper wall of the other side wall 136, 138. When the arms 122 of the divider component 120 are received in associated notches 142 in the side walls 136, 138, the divider component 120 is positioned parallel to each end wall 146, 148 of the main component 118. The divider component 120 includes a blade divider portion 140 that extends downwardly beyond the bottom wall of the side walls 136, 138 when the arms 122 of the divider component 120 are received in the notches 142.

In the illustrated embodiment, the main component 118 and divider component 120 are formed from sheet metal so that the divider portions 147, 149 of the end wall 146, 148 and the divider portion 140 of the divider component 120 may flex slightly to accommodate misalignment with the blades 24, 26 of the food processing apparatus 10. Alternatively, the meat orientation guide 28 could be made from other flexible materials such as plastic.

While described as utilizing a main component 118 and a divider component 120 to adjust the effective size of the upper and lower openings 124, 126 to more closely approximate a dimension of meat being fed through the meat orientation guide, it is within the scope of the disclosure for the meat orientation guide 28 to have other configurations. For instance, the meat orientation guide 28 may include a first member coupled to move relative to a second member to define a body having an adjustable upper opening and an adjustable lower opening. The upper opening 124 is for receipt of the meat and the lower opening 126 is positioned between the shafts 20, 22 of the first and second set of blades 24, 26. In the alternative embodiment, the first member of the meat orientation guide 28 could include side walls that are slidably received within side walls of the second member of the meat orientation guide 28. The sliding of side walls of the first member relative to the side walls of the second member would facilitate adjustment of the displacement between end walls of the meat orientation guide 28. The displacement between the end walls could be adjusted between an integer multiple of approximately eight millimeters and an integer multiple of approximately four millimeters so that the meat orientation guide 28 could be accommodated between pairs of blades 24, 26 in either the first or second regions of blade pairs 64, 68. Such a meat orientation guide could be configured to include a first lip and a second lip extending from opposite sides of the upper opening configured to engage and ride on the spines 100, 700 of the first and second comb-shaped guide members 96, 98, 696, 698. Alternatively, the lips may engage and ride on the upper surface of the housing 12 adjacent a meat feed hole 132 formed in the upper wall 134 of the housing 12. Thus, the non-illustrated meat orientation guide may be configured to slide along the spines 100, 700 or the upper wall 134 of the housing 12 so that the lower opening can be disposed over either the first region of blade pairs 64 or the second region of blade pairs 68.

Mounted to the frame 14 below the first and second set of disc shaped blades 24, 26 is a meat discharge chute 150 configured to catch processed meat that has been cut by the blades. The meat discharge chute 150 includes a slanted surface 152 communicating with a side discharge opening 154 formed in the side wall of the housing 12 through which processed meat is discharged under the influence of gravity.

In use, the meat orientation guide 28 is positioned according to the manner in which the meat is to be prepared (sliced, shredded or diced). When the meat is to be sliced, the meat orientation guide 28 is positioned so that the lower opening 126 is over the second region of blade pairs 68 that are illustratively spaced apart by approximately four millimeters. Thus, prior to, or during, placement of the meat orientation guide 28, the divider component 120 is placed in the main component 118 so that the displacement 144 between one of the end walls 146, 148 of the main component and the divider component 120 is approximately an integer multiple of four millimeters so meat guide 28 can be disposed between pairs of blade pairs in the second region of blade pairs 68. The meat is fed through the processor one time.

If the meat is to be shredded into strips, the meat orientation guide 28 is originally placed so that the lower opening 126 is over the second region of blade pairs 68 and adjusted as described above. While the orientation guide 28 is so positioned, the meat is fed through the food processing apparatus 10 one time. When the meat is being shredded into strips, the meat orientation guide 28 is moved after the first feed to a position where the lower opening 126 is over the first region of blade pairs 64 that are illustratively spaced apart by approximately eight millimeters. Prior to, or during, placement of the meat orientation guide 28, the divider component 120 is seated within the main component 118 so that the displacement 144 between one of the end walls 146, 148 and the divider component 120 is approximately an integer multiple of eight millimeters so that the guide 28 can be disposed between pairs of blade pairs in the first region of blade pairs 64. After placement, properly oriented meat is fed through the food processing apparatus 10 a second time to form strips.

If the meat is to be diced into cubes, the meat orientation guide 28 is placed so that the lower opening 126 is over the first region of blade pairs 64 and adjusted as described above. The meat is fed through the food processing apparatus 10 three times with the orientation of the meat being changed after each feeding.

In the illustrated embodiments, the meat is fed through a top meat feed opening 132 in the housing 12 of the food processing apparatus 10 into the space between the shafts 20, 22 to which the first and second sets of blades 24, 26, respectively, are mounted. The meat is guided by the comb-shaped guide members 96, 98, 696, 698 alone or the comb-shaped guide members 96, 98, 696, 698 and the meat orientation guide 28. Below the blades 24, 26, the comb-shaped guide members 96, 98, 696, 698 guide the cut meat onto the discharge chute 150 that has a sloped bottom surface 152 that exits through the discharge opening 154 formed in the side wall of the housing 12.

As stated above, the food processing apparatus 10 includes two subsets of blades on each shaft 20, 22 that cooperate to form two regions of blade pairs 64, 68 in which the pairs of blades in each region 64, 68 are differently spaced. Preferably the food processing apparatus 10 should be for preparation of meat and even more preferably for preparation of unfrozen meat for Chinese cooking, including both cooked and raw meat.

The pair of parallel shafts 20, 22 extend through the frame members, and are journaled therein. The first shaft 20 has an extended portion on one end 44 to which is affixed the driven pulley 74, 674 which receives the belt 76 or belts 676, 678 to permit rotation of the shaft 20 by the motor 16. Mounted on the shaft 20 adjacent the gear end 48 is the drive gear 80 and mounted adjacent the gear end 52 of the shaft 22 is the driven gear 88 which meshes with the drive gear 80. Thus, when motor 16 is rotated, the driven pulley 74, 674 on the pulley end 44 of the shaft 20 rotates the shaft 20. The drive gear 80 on the opposite end 48 of shaft 20 drives the driven gear 88 coupled to the second shaft 22. In this manner, shafts 20, 22 are made to be contra-rotating. Since gears 80, 88 are the same diameter and contain the same number of teeth, shafts 20, 22 rotate at the same speed.

In the illustrated embodiment, the frame 14 has an interior transverse wall 164 which isolates the gears 80, 88 from the remainder of the enclosed volume which includes the meat cutting region. Such isolation insures that any minute metal shavings, where gears 80, 88 are made of metal, or plastic shavings, where they are of plastic, will not intrude into the meat cutting region.

Figure 7:
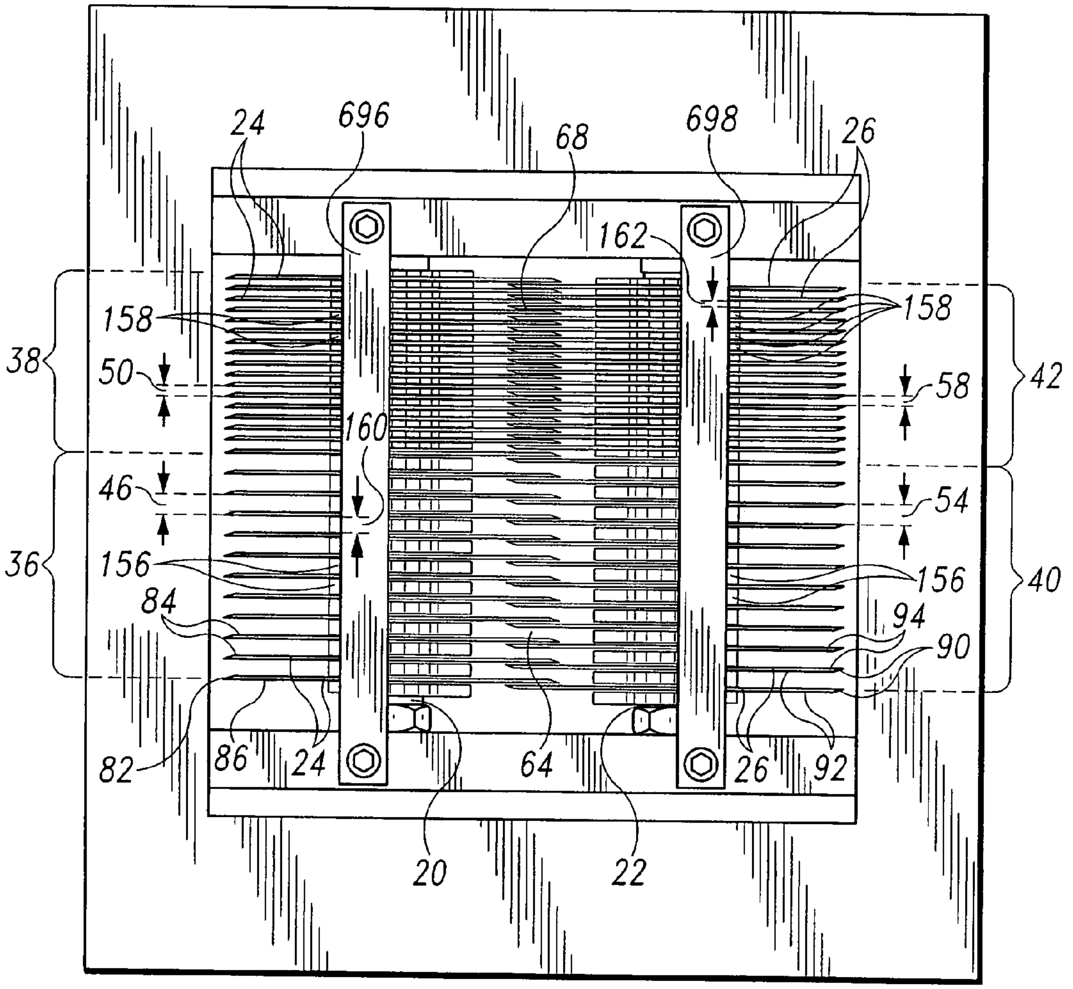
FIG. 7 is a plan view of the food processing apparatus of FIG. 6 with a top cover removed showing the first meat guide affixed to the frame to dispose the fingers thereof between adjacent blades on the first shaft and the second meat guide affixed to the frame to dispose the fingers thereof between adjacent blades on the second shaft and showing blades on the first shaft interleaving with the blades on the second shaft to form a first region of cooperating pairs of blades having a first displacement between adjacent cooperating pairs of blades therein and a second region of cooperating pairs of blades having a second displacement between adjacent cooperating pairs of blades therein.
Figure 8:
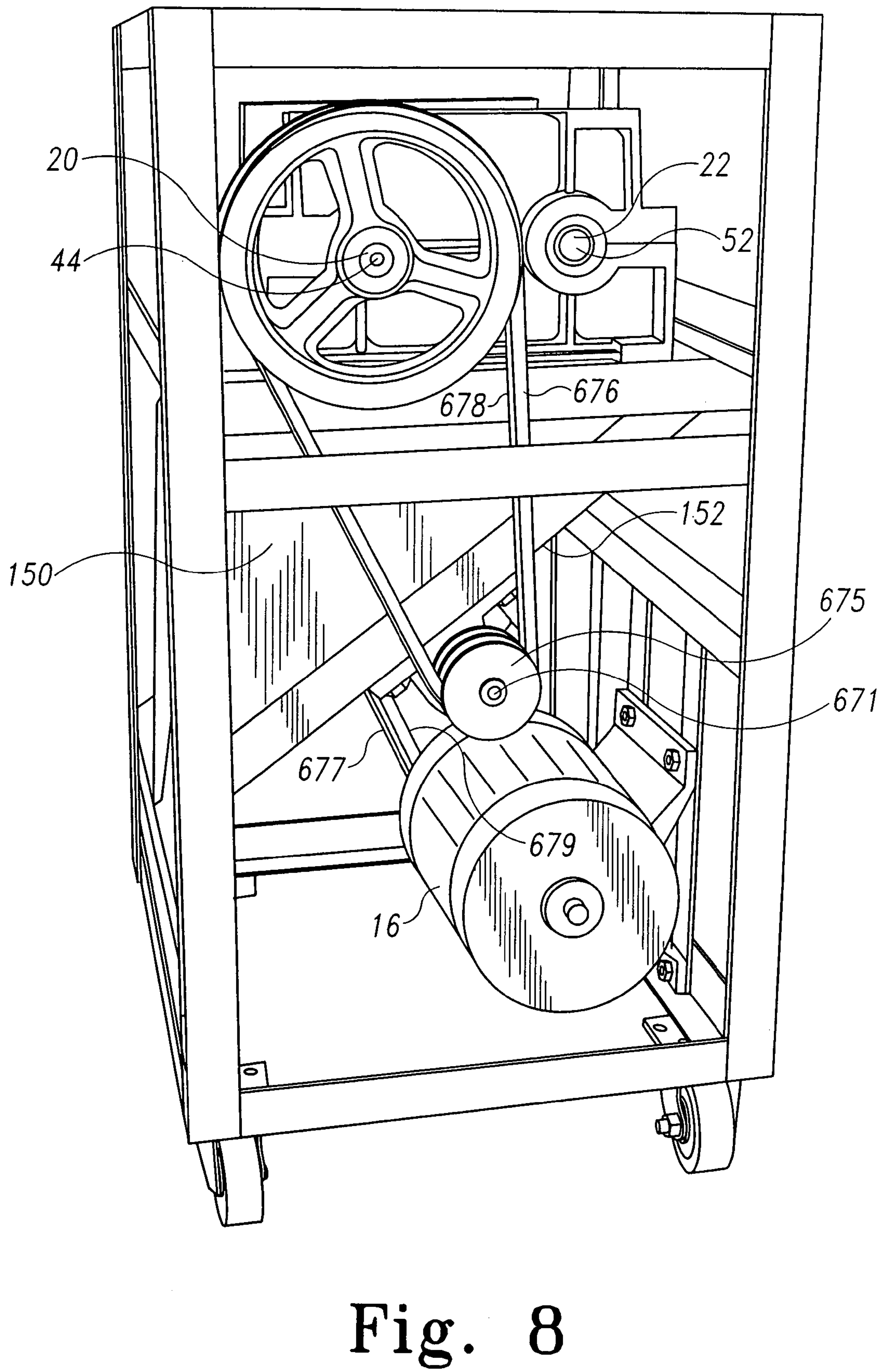
FIG. 8 is a perspective view of the food processing apparatus of FIG. 6 with a body cover removed to show a portion of a linkage including a drive shaft having a small drive pulley coupled to its end, a large pulley coupled to the end of the first shaft and a plurality of belts coupling the small pulley to the large pulley.
Figure 9:
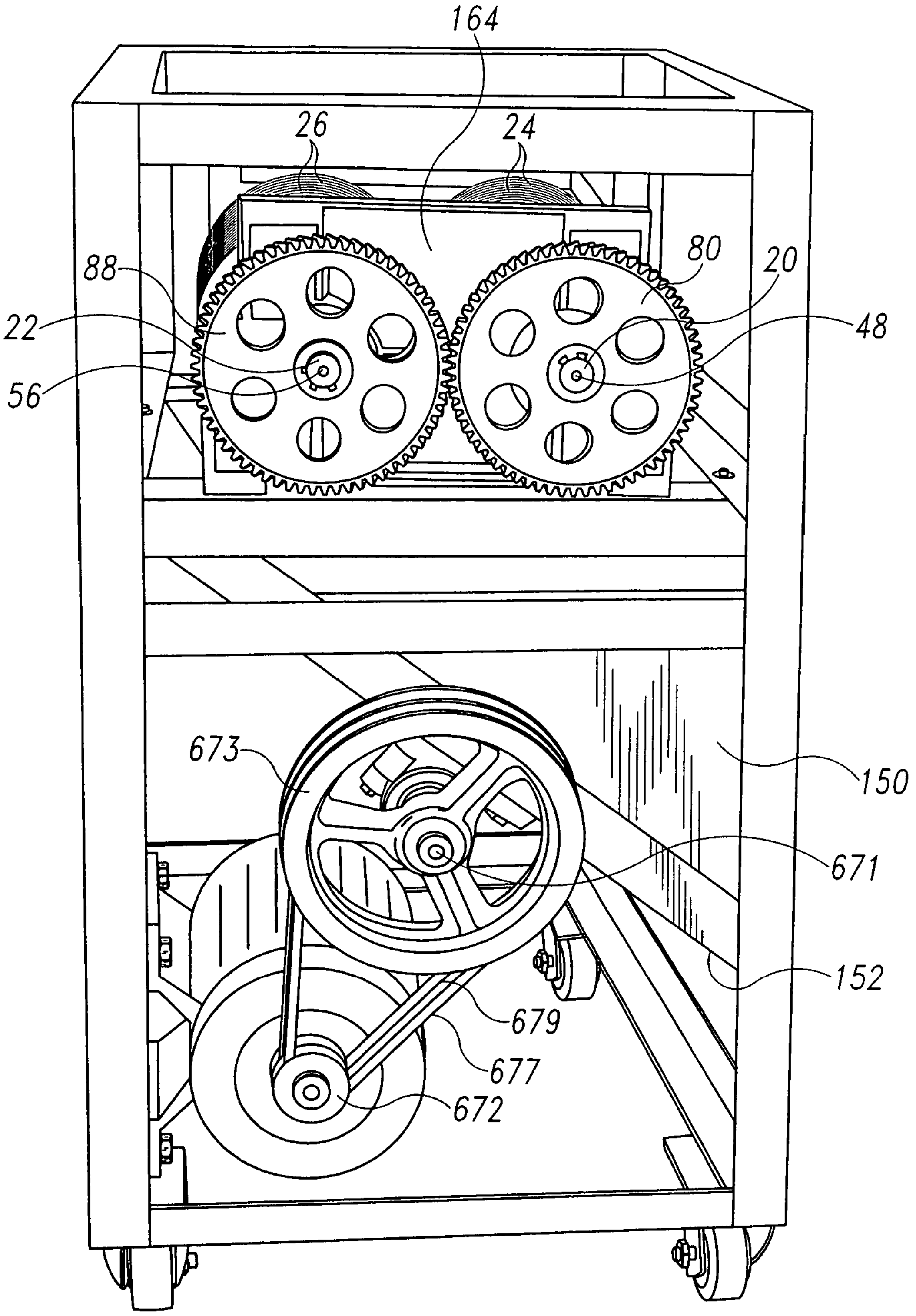
FIG. 9 is a perspective view of the food processing apparatus of FIG. 8 showing another portion of the linkage including a motor with a small pulley coupled to its shaft, a large pulley coupled to the end of the drive shaft and a pair of belts coupling the small pulley to the large pulley and showing intermeshing gears coupled to the ends of the first and second shafts to induce counter rotation of the shafts.
Figure 10:
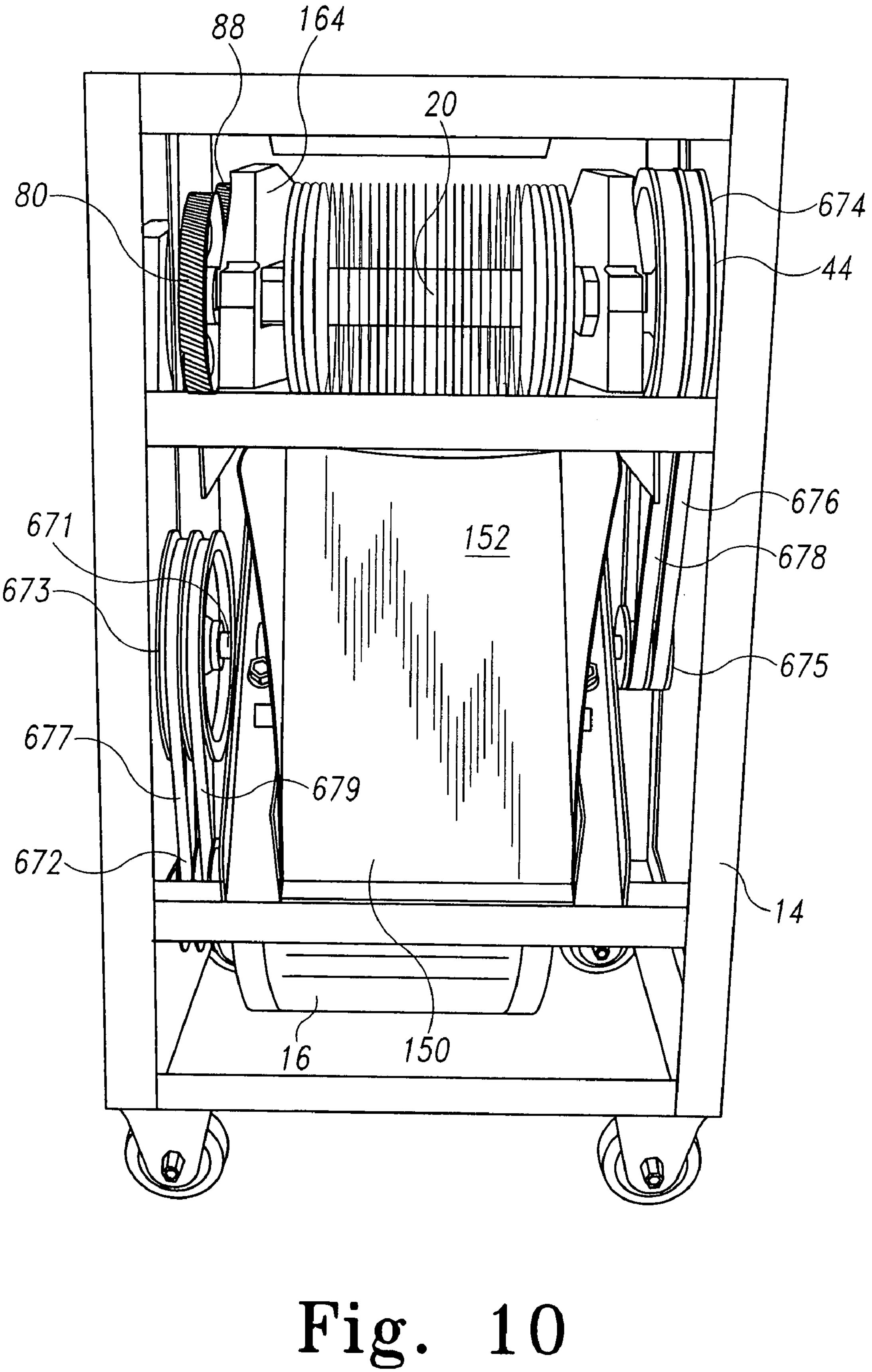
FIG. 10 is a perspective view of the front of the food processing apparatus of FIG. 9.
Figure 11:
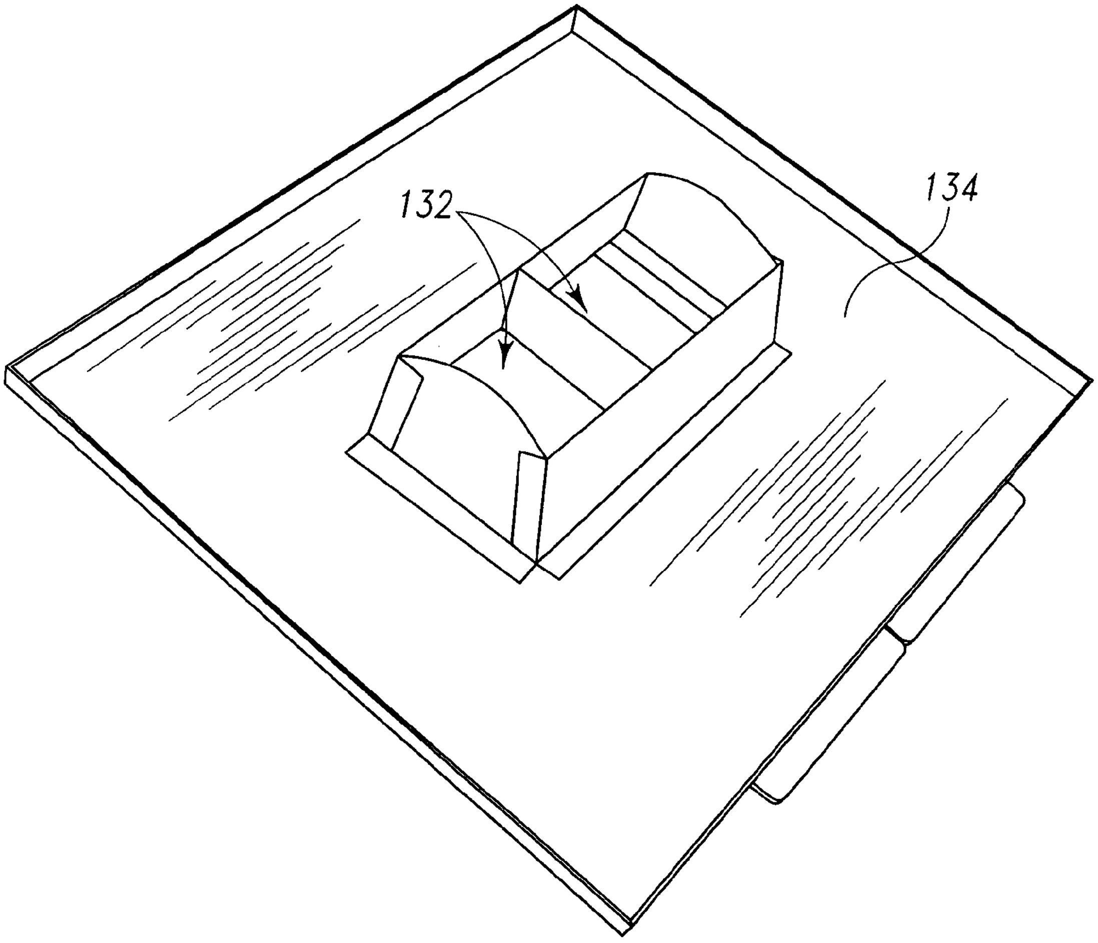
FIG. 11 is a perspective view of the underside of a blade cover of the food processing apparatus of FIG. 6 showing a first opening through the cover positioned to be disposed over the first region of blades and a second opening in the cover positioned to be disposed over the second region of blades when the cover is affixed to the apparatus.
Figure 12:
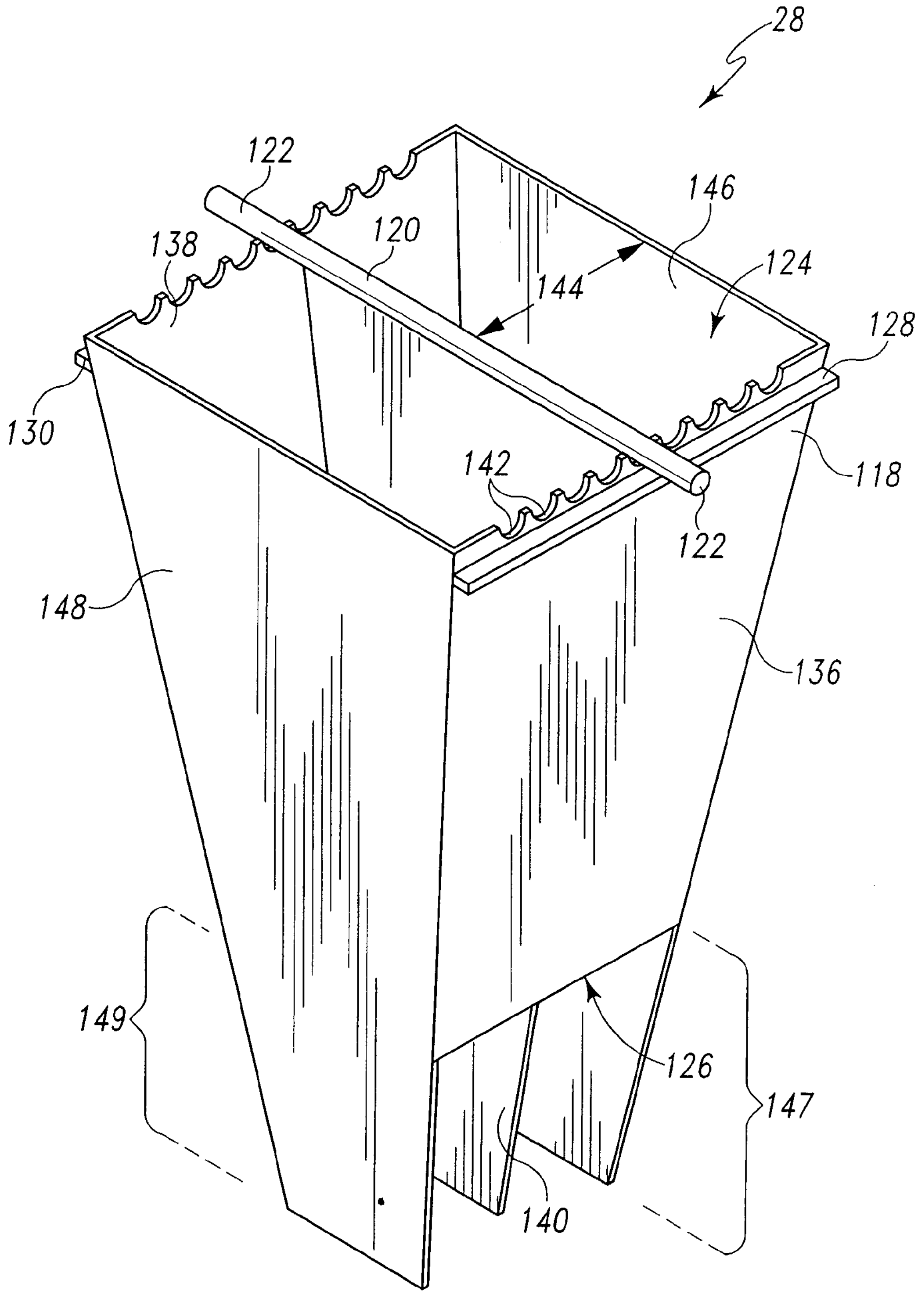
FIG. 12 is a perspective view of a meat orientation guide configured to be place over the first or second region of blades to guide meat to be cut.
Figure 13:
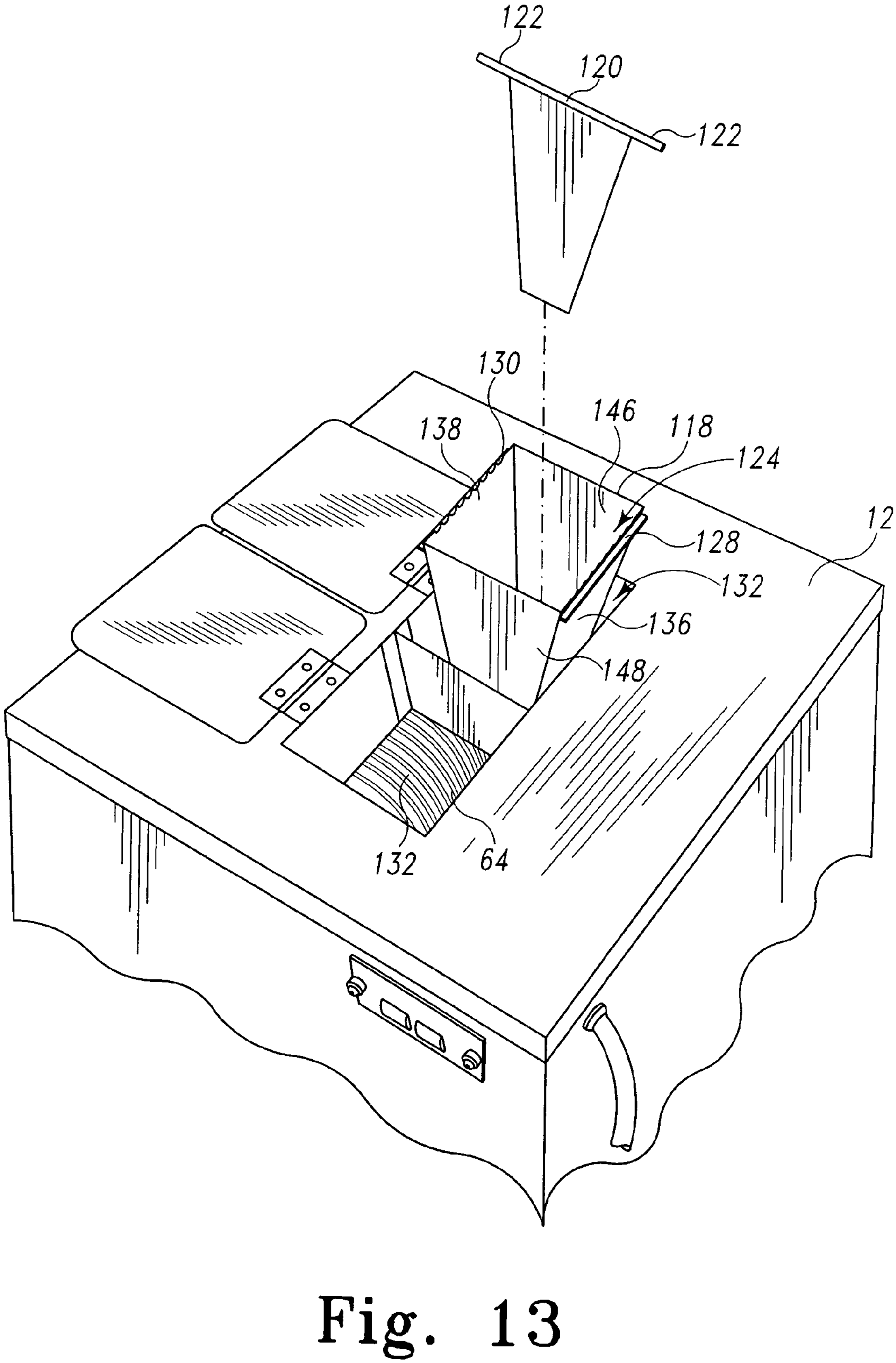
FIG. 13 is a perspective view of the food processing apparatus of FIG. 6 with the body cover affixed to the frame, the blade cover of FIG. 11 mounted on the frame and the meat orientation guide of FIG. 12 partially inserted in the first opening of the cover.

FIG. 7 illustrates the positioning of the cutter discs 24, 26 on the shafts 20, 22, respectively, and their positional relationship to each other. The discs 24, 26, whose cutting edges are beveled on one side 84, 92 only, but which may be beveled on both sides, are arranged in spaced relationship on shaft 20, 22 by means of a plurality of spacers 156, 158, as shown. Each of the first plurality of spacers 156 has a thickness 160 approximately equal to the displacement 46, 54 between the first and third subset of blades 36, 40. Each of the second plurality of spacers 158 have a thickness 162 approximately equal to the displacement 50, 58 between the second and fourth subset of blades 38, 42. One of the first plurality of spacers 156 is mounted on shaft 20 disposed between each adjacent pair of blades 24 in the first subset of blades 36. Similarly, one of the first plurality of spacers 156 is mounted on shaft 22 disposed between each adjacent pair of blades 26 in the third subset of blades 40. One of the second plurality of spacers 158 is mounted on shaft 20 disposed between each adjacent pair of blades 24 in the second subset of blades 38. Similarly, one of the second plurality of spacers 158 is mounted on shaft 22 disposed between each adjacent pair of blades 26 in the fourth subset of blades 42. It is to be understood that other means of securing the cutter disc arrays on their respective shafts 20, 22 might be used, the arrangement shown in FIG. 7 being preferred, however, for its simplicity and ease of disassembly.

The displacement between adjacent discs in the same subset of blades on the same shaft determines the width of the strip of meat produced. While the disclosed embodiment shows only two subsets of blades on each shaft 20, 22, it is within the scope of the disclosure to include three or more subsets of blades on each shaft with each subset of blades having different displacements between the blades of the same subset.

From the forgoing description of a preferred embodiment incorporating the features of the invention, it can be seen that, in operation, the apparatus cuts food, especially meat, into neat, clean-cut strips, slices or cubes, regardless of whether the food is raw or cooked.

The forgoing description of an embodiment of the invention has been for purposes of illustrating the principles thereof. Numerous modifications, alternations, or variations may occur to workers skilled in the art without departure from the spirit and scope of the invention.

What is claimed is:

1. A food processing apparatus for slicing food into slices, strips and cubes comprising:

a frame;

a first shaft coupled to the frame for rotation relative to the frame about a longitudinal axis of the first shaft;

a second shaft coupled to the frame for rotation relative to the frame about a longitudinal axis of the second shaft, the longitudinal axis of the second shaft being disposed substantially parallel to the longitudinal axis of the first shaft and being displaced therefrom by a displacement;

a first subset of blades mounted to the first shaft, each blade of the first subset of blades being displaced along the longitudinal axis of the first shaft from adjacent blades of the first subset of blades by a first displacement;

a second subset of blades mounted to the first shaft, each blade of the second subset of blades being displaced along the longitudinal axis of the first shaft from adjacent blades of the second subset of blades by a second displacement differing from the first displacement;

a third subset of blades mounted to the second shaft, each blade of the third subset of blades being displaced along the longitudinal axis of the second shaft from adjacent blades of the third subset of blades by the first displacement;

a fourth subset of blades mounted to the second shaft, each blade of the fourth subset of blades being displaced along the longitudinal axis of the second shaft from adjacent blades of the fourth subset of blades by the second displacement, wherein the first subset of blades cooperate with the third subset of blades to form a first cutting region therebetween for cutting food to a first dimension and the second subset of blades cooperate with the fourth subset of blades to form a second cutting region therebetween for cutting food to a second; and a food orientation guide configured to be positioned relative to the frame in a first position or a second position, wherein food guided by the food orientation guide is guided through the first cutting region and is blocked from the second cutting region when the food orientation guide is in the first position, and wherein food guided by the food orientation guide is guided through the second cutting region and is blocked from the first cutting region when the food orientation guide is in the second position.

2. The apparatus of claim 1, and further comprising:

a motor having a drive shaft;

a linkage coupling the drive shaft of the motor to the first shaft, the linkage being configured to transfer drive shaft rotation to rotation of the first shaft in a first direction.

3. The apparatus of claim 2, and further comprising a shaft linkage coupling the first and second shafts and configured to induce rotation of the second shaft when the first shaft rotates.

4. The apparatus of claim 3, wherein the second shaft rotates in a second direction opposite to the first direction.

5. The apparatus of claim 4, wherein each blade of the subsets of blades comprises a disc shaped cutter having a cutting surface formed on the peripheral edge thereof and each blade is mounted generally perpendicular to the longitudinal axis of the shaft to which it is mounted.

6. The apparatus of claim 5, wherein each blade of the subsets of blades has a diameter greater than the displacement between the longitudinal axes of the shafts so that the blades on one shaft interleave with the blades on the other shaft.

7. The apparatus of claim 6 and further comprising a first guide mounted to the frame and configured to prevent food from wrapping around the first shaft when processed.

8. The apparatus of claim 7, wherein the first guide includes a spine and a first plurality of fingers extending therefrom and a second plurality of fingers extending therefrom, each of the first plurality of fingers being configured to extend between adjacent blades in the first subset of blades and each of the second plurality of fingers being configured to extend between adjacent blades in the second subset of blades.

9. The apparatus of claim 1, wherein each blade of the subsets of blades comprises a disc shaped cutter having a cutting surface formed on the peripheral edge thereof and each blade is mounted generally perpendicular to the longitudinal axis of the shaft to which it is mounted.

10. The apparatus of claim 1, and further comprising:

a motor having a drive shaft;

a linkage coupling the drive shaft of the motor to the first and second shafts and configured to induce contra-rotation of the first and second shafts upon rotation of the drive shaft of the motor.

11. A food processing apparatus comprising:

a frame;

a first shaft coupled to the frame for rotation relative to the frame about a longitudinal axis of the first shaft;

a second shaft coupled to the frame for rotation relative to the frame about a longitudinal axis of the second shaft, the longitudinal axis of the second shaft being disposed substantially parallel to the longitudinal axis of the first shaft and being displaced therefrom;

a first set of pairs of cooperating blades, each pair of cooperating blades including a first blade mounted to the first shaft and a second blade mounted to the second shaft in close proximity to the first blade and each pair of cooperating blades being spaced apart from adjacent pairs of cooperating blades in the first set of pairs of cooperating blades by a first displacement, each pair of cooperating blades of the first set of pairs of cooperating blades being adjacent another pair of cooperating blades of the first set of pairs of cooperating blades to define a first cutting region between the first and second shaft;

a second set of pairs of cooperating blades, each pair of cooperating blades including a first blade mounted to the first shaft and a second blade mounted to the second shaft in close proximity to the first blade and each pair of cooperating blades being spaced apart from adjacent pairs of cooperating blades in the second set of pairs of cooperating blades by a second displacement greater than the first displacement, each pair of cooperating blades of the second set of pairs of cooperating blades being adjacent another pair of cooperating blades of the second set of pairs of cooperating blades to define a second cutting region between the first and second shaft;

a motor having a drive shaft;

a linkage configured to convert rotation of the drive shaft of the motor into rotation of the first and second shafts; and a food orientation guide movable relative to the frame between a first position and a second position, the food orientation guide adapted to guide food into the first cutting region when in the first position and adapted to guide food into the second cutting region when in the second position.

12. The apparatus of claim 11, wherein the linkage induces the first shaft to rotate in counter relationship to the rotation of the second shaft.

13. The apparatus of claim 12, wherein the first shaft rotates at substantially the same speed of rotation as the second shaft when rotated.

14. The apparatus of claim 11 and further comprising a guard including a plurality of fingers extending through the cutting regions, each pair of adjacent fingers straddling a cooperating pair of blades.

15. A food processing apparatus comprising:

a frame;

a first shaft coupled to the frame for rotation relative to the frame about a longitudinal axis of the first shaft;

a second shaft coupled to the frame for rotation relative to the frame about a longitudinal axis of the second shaft, the longitudinal axis of the second shaft being disposed substantially parallel to the longitudinal axis of the first shaft and being displaced therefrom;

a first set of pairs of cooperating blades, each pair of cooperating blades including a first blade mounted to the first shaft and a second blade mounted to the second shaft in close proximity to the first blade and each pair of cooperating blades being spaced apart from adjacent pairs of cooperating blades in the first set of pairs of cooperating blades by a first displacement, each pair of cooperating blades being adjacent another pair of cooperating blades to define a first cutting region between the first and second shaft;

a second set of pairs of cooperating blades, each pair of cooperating blades including a first blade mounted to the first shaft and a second blade mounted to the second shaft in close proximity to the first blade and each pair of cooperating blades being spaced apart from adjacent pairs of cooperating blades in the second set of pairs of cooperating blades by a second displacement different than the first displacement, each pair of cooperating blades being adjacent another pair of cooperating blades to define a second cutting region between the first and second shaft; and a food orientation guide positioned on the frame, the food orientation guide adapted to direct food through the first cutting region and block food from the second cutting region.

16. The apparatus of claim 15, wherein the means for rotating the first and second shafts comprises a gear member mounted on each shaft adapted to mesh with the gear mounted on the other shaft, and a motor for rotating one of the shafts.

17. The apparatus of claim 16, and further comprising first and second spaced guides mounted to the frame and extending into the cutting regions and between adjacent cooperating pairs of blades.

18. The apparatus of claim 17, wherein the first guide and the second guide each comprises a plurality of fingers and adjacent fingers straddle a cooperating pair of blades.

* * * * *